(12) United States Patent
Goswami et al.

(10) Patent No.: US 7,000,762 B2
(45) Date of Patent: Feb. 21, 2006

(54) ILLUMINATED CD JEWEL BOX

(76) Inventors: Vinod Kumar Goswami, 1403 LaGrange St., Chestnut Hill, MA (US) 02467; Vinita Goswami, 1403 LaGrange St., Chestnut Hill, MA (US) 02467

( * ) Notice: Subject to any disclaimer, the term of this patent is extended or adjusted under 35 U.S.C. 154(b) by 188 days.

(21) Appl. No.: 10/423,592

(22) Filed: Apr. 25, 2003

(65) Prior Publication Data

US 2003/0201196 A1    Oct. 30, 2003

Related U.S. Application Data

(60) Provisional application No. 60/376,104, filed on Apr. 27, 2002.

(51) Int. Cl.
*B65D 85/57*    (2006.01)
(52) U.S. Cl. ............................. 206/308.1; 206/459.5
(58) Field of Classification Search ............ 206/308.1, 206/232, 309, 312, 387.1, 459.5; 369/75.11, 369/77.11, 77.21
See application file for complete search history.

(56) References Cited

U.S. PATENT DOCUMENTS

| | | | | |
|---|---|---|---|---|
| 5,893,455 A | * | 4/1999 | Biedebach et al. | 206/308.1 |
| 5,971,143 A | * | 10/1999 | Yoshioka | 206/307 |
| 6,152,297 A | * | 11/2000 | Roth et al. | 206/308.1 |
| 6,179,119 B1 | * | 1/2001 | Manoogian | 206/308.1 |
| 6,229,779 B1 | * | 5/2001 | Berry et al. | 720/655 |
| 6,338,405 B1 | * | 1/2002 | Yoerg et al. | 206/308.1 |

* cited by examiner

*Primary Examiner*—Shian T. Luong
(74) *Attorney, Agent, or Firm*—Kaplesh Kumar

(57) ABSTRACT

A compact disc (CD) jewel box is described in which a multifunction light is positioned within the cavity space defined by the CD storage compartment and the CD support tray. The CD jewel box is illuminated with light from one or more light emitting diodes (LEDs) powered by small power supplies or battery cells, using one or more switches that are optionally sensitive to pressure, motion, ambient sound, or light levels. The multifunction light dynamically illuminates the prescribed spaces within the jewel box. A light conducting optical lens is provided to enhance the visual effects by transporting the light as desired. The support tray is constructed from a transparent material, preferably a transparent plastic.

11 Claims, 4 Drawing Sheets

ILLUMINATED CD JEWEL BOX

This application claims the benefit of U.S. Provisional Application No. 60/376,104 filed on Apr. 27, 2002.

BACKGROUND OF THE INVENTION

The present invention relates generally to illuminated concert lights and more specifically to uniquely illuminating the CD jewel box by a multifunction light positioned within a cavity in the CD jewel box.

For years, music concerts have featured special visual effects created by light from flames of cigarette lighters. Since the naked flames pose a fire hazard, more benign light effects produced using light emitting diodes (LEDs) have become popular. The music industry promotes individual or group performers through the concert events. The payoff is a potentially increased demand in the marketplace for the music of these performers. The music, which is typically recorded on compact discs (CDs), is sold at retail prices to the consumer. For purposes of promotion, CDs are on occasion made available for a price to concert attendees.

Compact discs, developed in the early 1980s, are now well established in the music, motion picture, and computer game industries. The CDs are digitally encoded with sound and music recordings. More recently, CDs known as Digital Video Discs (DVDs), in which movies and video games with accompanying sound are similarly recorded, have become very popular. The CD's success stems from the high fidelity of its recording, and its compactness, convenience, and competitive cost vis a vis other storage media. CDs are mostly packaged and marketed in transparent plastic boxes, which are referred to in the art as "CD cases," "CD boxes," or "CD jewel boxes." The CD jewel boxes are manufactured to strict design and dimensional industry standards.

To connect the concert events with the music and video CDs on sale, it is desirable that LED lights similar to those at the music events be also featured in the CDs. When activated, the emitted light and its pre-selected colors serve the aesthetically pleasing function of reminding one of the source of the music, while also differentiating the CD from the music of other artistes or recording companies. A conveniently activated light source, when available within the CD, also serves a safety and convenience function. For instance, when driving during the dark evening or night hours, automobile drivers or their passengers can readily discriminate among the various CDs by the light patterns emitted, instead of having to turn on the car's interior dome or glove box lights for reading the printed content on the CD's exterior.

To draw the consumer's attention to the product, U.S. Pat. No. 5,893,455, issued Apr. 13, 1999 to D. H. Biedebach and K. M. Kajka, describes placing a three dimensional object in the void space of the "spine" of the CD. This differentiation, however, requires that the object be viewed in a well-lit area. Similarly, U.S. Pat. No. 5,971,143, issued Oct. 26, 1999 to K. Yoshioka, describes locating ornamental and fragrance functions in the same "spine" space, referred to in the patent as the "hinge portion" of the "main portion" of the CD. While these functions are pleasing to the senses, they are limited in their ability to distinguish the product. As with the Biedebach patent, the ornamental feature limits the ability to identify the CD to properly lit areas, while the fragrance provides little to no distinguishing ability since the fragrance migrates and its effect cannot be localized to the particular CD. The "spine" space is identified in the present specification as a "cavity" and in the U.S. provisional application, from which it derives the filing date benefit, as the "space at the top of the box, where the lid is hinged to the base of the box."

U.S. Pat. No. 5,521,802, issued May 28, 1996 to D. C. Edington, uses light from light emitting diodes (LEDs) to both differentiate the product as well as provide the means by which the CD contents can be read in dimly lit conditions. The Edington patent, however, requires that the CD box be physically modified, increasing its cost substantially and rendering it commercially less desirable and perhaps even non-viable. The CD jewel box casing has to be drilled to provide access for a manual pressure switch so that the LED can be activated. The enabling battery and circuitry in the Edington patent is located inside the "main portion" of the CD's storage compartment, requiring further modification and likely additional increase in cost.

A CD jewel box in which the light emitting means are effected for product identification and differentiation without any modification of the CD jewel box structure is highly desirable, and provided in the instant invention.

BRIEF SUMMARY OF THE INVENTION

Accordingly, the primary object of the invention is to provide an illuminated CD jewel box that overcomes the shortcomings of the prior art.

An object of the present invention is to produce an illuminated CD jewel box in which the light emitting and transportation means for product identification and differentiation even in dimly lit conditions are provided without any physical modification of the CD jewel box structure.

Another object of the present invention is to provide an illuminated CD jewel box in which the light emitting and transportation means are located within the pre-existing unused cavity space between the CD storage compartment and the CD support tray.

Yet another object of the present invention is to produce a CD jewel box in which the artwork is illuminated by the light emitting and transportation means provided.

Still another object of the present invention is to provide an illuminated CD jewel box that enhances product differentiation and marketing from superior packaging and display in the point of sale environment.

A further object of the present invention is to provide an illuminated CD jewel box that is safe and easy to use at music concerts and other live entertainment events, or when being handled it in dimly lit conditions.

The objects of the present invention are accomplished in the illuminated CD jewel box set forth in the detailed description and claimed in this specification.

Briefly, the present invention implements the light emitting and transportation means for illuminating the CD jewel box by co-locating its components within the cavity space between the CD storage compartment and the CD support tray, which otherwise lies empty and unused in the CD jewel boxes made to strict industry standards. No physical modification of the CD jewel box is required. The light emitting and transportation means may optionally include one or more LED lamp or other similar light source, battery or other similar power supply, optical lens, switch, and appropriate circuit wiring. (Miniaturized thin film battery and other components are used for the latest thin CD jewel boxes.) The switch is optionally activated using pressure, motion, ambient sound, or light levels. The shape and position of the lens(es) is varied within the cavity space to direct the light for patterning or otherwise selectively illuminating the CD jewel box and associated art work. The visuals on the CD jewel box surface areas are optionally enhanced with pre-programmed displays or animations using electronic ink.

The illuminated CD jewel box of the present invention departs substantially from the conventional concepts and designs of the prior art. Its more important features have been summarized so that the detailed description thereof may be better understood and the contribution to the art better appreciated. Additional optional features of the invention evident to one of ordinary skill in the art are within the spirit and scope of the instant invention.

BRIEF DESCRIPTION OF THE SEVERAL VIEWS OF THE DRAWING

The various objects, features, and attendant advantages of the present invention will be more fully understood when considered in conjunction with the drawings presented.

DETAILED DESCRIPTION OF THE INVENTION

The illuminated CD jewel box comprising the present invention mimics the music concert lights and serves to identify the CD in dimly lit areas while also differentiating it as to its source. Although the discussion herein deals primarily with the music industry, the instant invention has as much or more applicability to CDs packaged for the motion picture and computer game industries, as would be evident to one of ordinary skill in the art. All such applications are deemed to be within the scope of the present invention. The description herein provides a novel illuminated CD jewel box that is not anticipated, rendered obvious, or suggested by the prior art.

Figure 1:
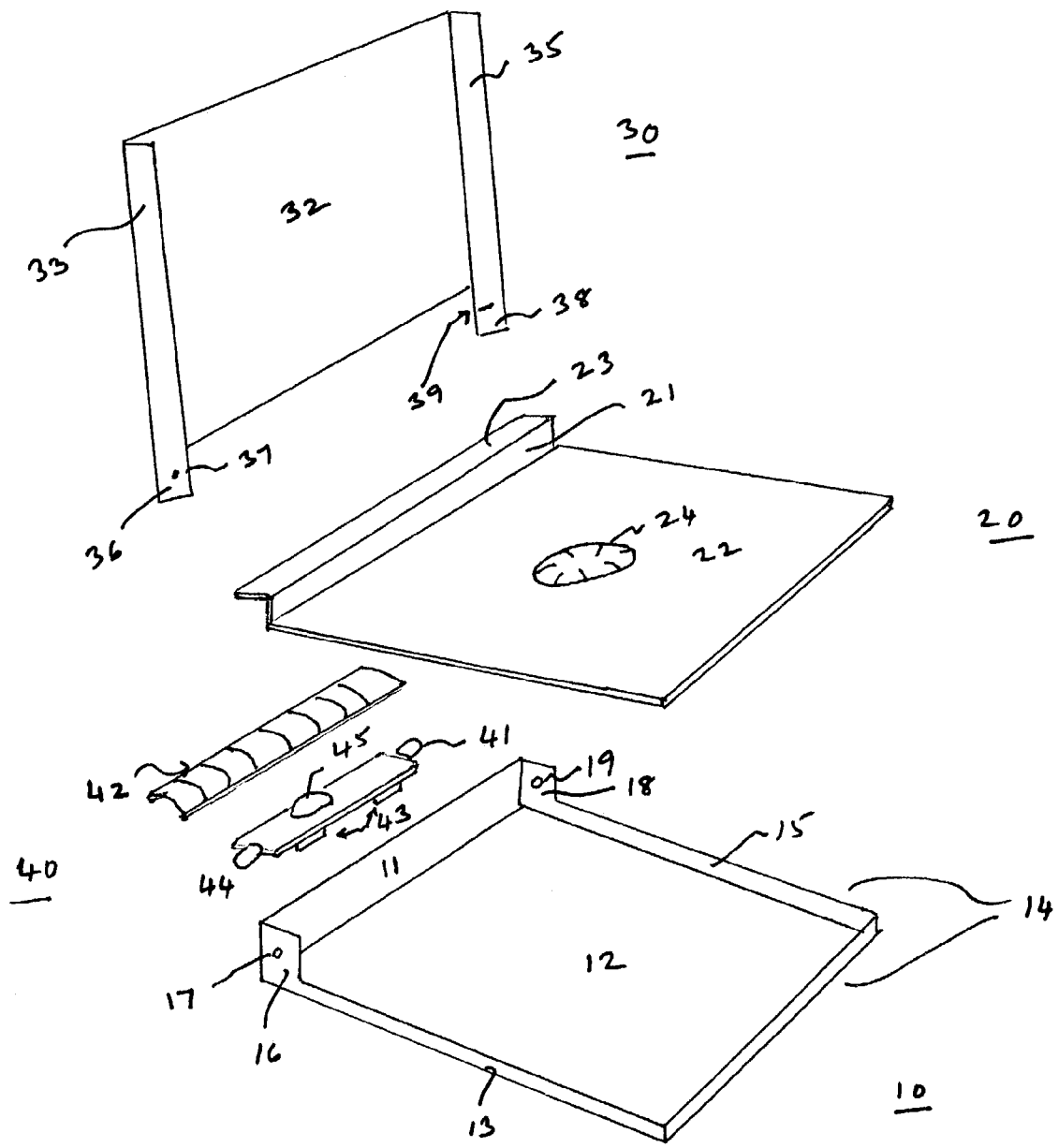
FIG. 1 is an exploded view of the illuminated CD jewel box of the present invention.

The principal parts of the illuminated CD jewel box of the present invention are shown in FIG. 1. They consist of a CD storage compartment 10, CD support tray 20, hinged lid 30, and light emitting and transportation means 40. The CD support tray 20 is constructed from a transparent or translucent material, preferably a transparent or translucent plastic. Although not intended as a limitation, the CD storage compartment 10 and lid 30 may also be optionally constructed from similar transparent or translucent material. The designs of the storage compartment 10, support tray 20, and lid 30 are well known in the art since they are fabricated to strict design and dimensional industry standards.

The storage compartment 10 comprises a hollow box with a rectangular base 12 from which contiguous vertical walls 14, including rear wall 11 and sidewalls 13 and 15, extend upwards. The rear wall 11 and portions 16 and 18 of sidewalls 13 and 15 in intimate contact with rear wall 11 extend upwards higher than the remaining walls 14. Portions 16 and 18 of sidewalls 13 and 15, respectively, have holes 17 and 19 so that the line connecting them defines the axis about which the lid 30 is hinged when assembled to the storage compartment 10.

Figure 2:
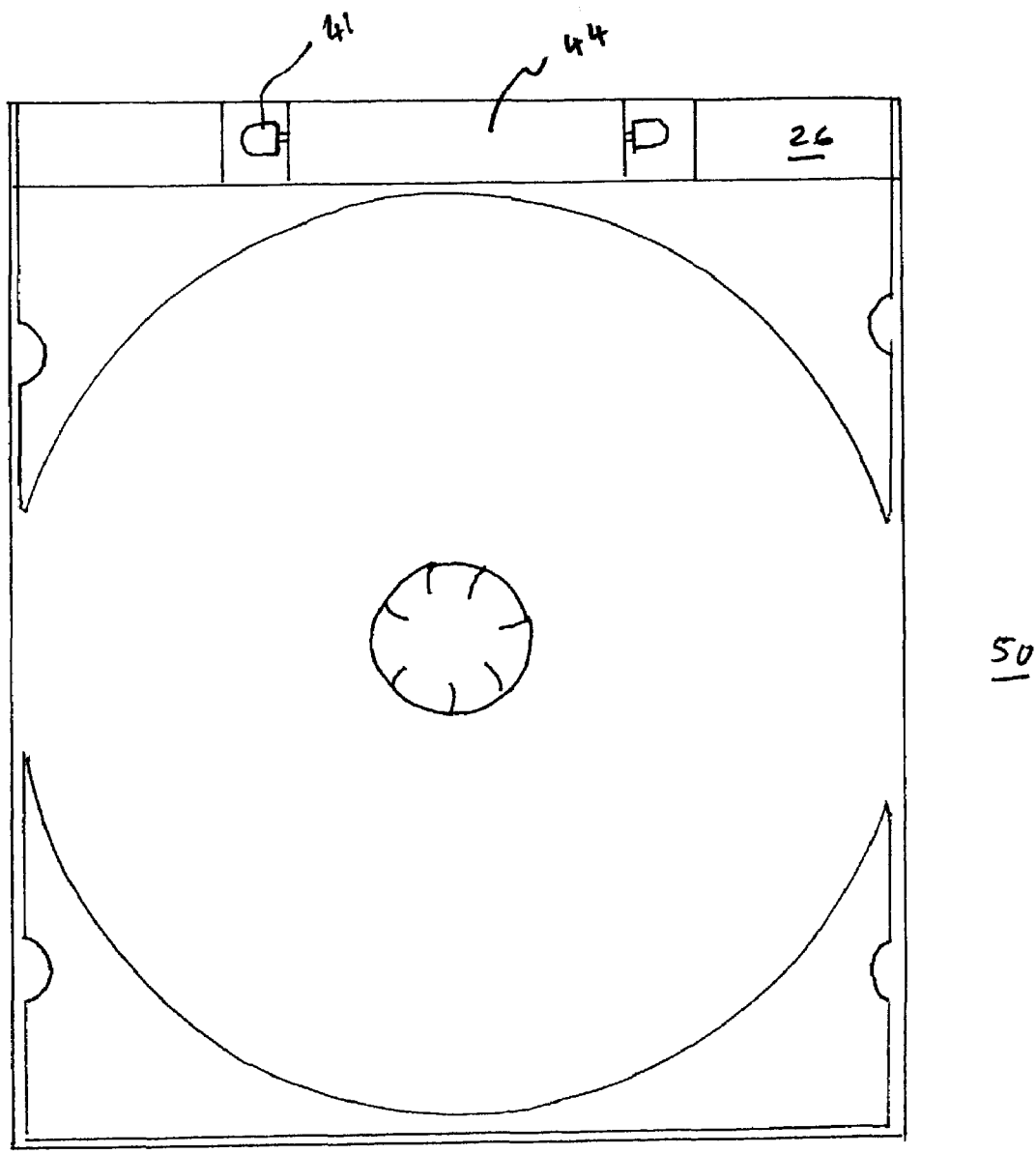
FIG. 2 is a top view of the illuminated CD jewel box of the present invention.

The CD support tray 20 consists of a rectangular base 22 with a CD capture feature 24 centered within it. A rear wall 21 extends upwards from the base 22 and terminates into a horizontal wall 23 pointing away from the base 22 and terminating in a free end. The support tray 20 is dimensioned so that it is completely received within the storage compartment 10 upon assembly. Upon assembly, the base 22 of the support tray 20 intimately contacts and rests upon base 12 of the storage compartment 10 while the free end of the support tray's horizontal wall 23 contacts and terminates at the rear wall 11 of the storage compartment 10, thereby enclosing the void space comprising the rectangular cross section elongated cavity 26 in FIG. 2, which extends along and about the hinge axis defined by holes 17 and 19 in the storage compartment 10. FIG. 2 presents a top view of the fully assembled illuminated jewel box 50 comprising the present invention. The cavity 26 is defined by the base 12, rear wall 11, and sidewall portions 16 and 18 of the storage compartment 10 as well as the rear wall 21 and horizontal wall 23 of the support tray 20 upon assembly.

The lid 30 consists of a cover 32 and extending downward therefrom sidewalls 33 and 35, with each sidewall having portions 36 and 38, respectively, extending beyond the cover 32, said wall portions having small cylindrical posts 37 and 39 pointing inwards toward each other and located at near the geometric centers of said portions 36 and 38. Upon assembly, the sidewall portions 36 and 38 overlap the external surfaces of the sidewall portions 16 and 18 of storage compartment 10 and the posts 37 and 39 of the lid 30 are received within the holes 17 and 19 of the storage compartment 10, so that the lid 30 is hinged about the axis defined by holes 17 and 19 of the storage compartment 10. The sidewalls 33 and 35 of the lid 30 intimately contact and enclose within them sidewalls 13 and 15 of the storage compartment 10 when the CD jewel box is assembled and the lid 30 is closed. The cover 32 of the lid 30 encloses the area defined by the base 22 of the support tray 20 inserted into the storage compartment 10, but not the area defined by the horizontal wall 23 which remains exposed to the outside when the lid 30 is closed.

The construction of the CD jewel box heretofore described is well known in the art and practiced accordingly to strict industry design and dimensional standards. The present invention increases the utility of the existing CD jewel box design by implementing within its cavity space 26 light emitting and transportation means 40. The practice of the present invention requires no modification of the CD jewel box's pre-existing structure.

Figure 3:
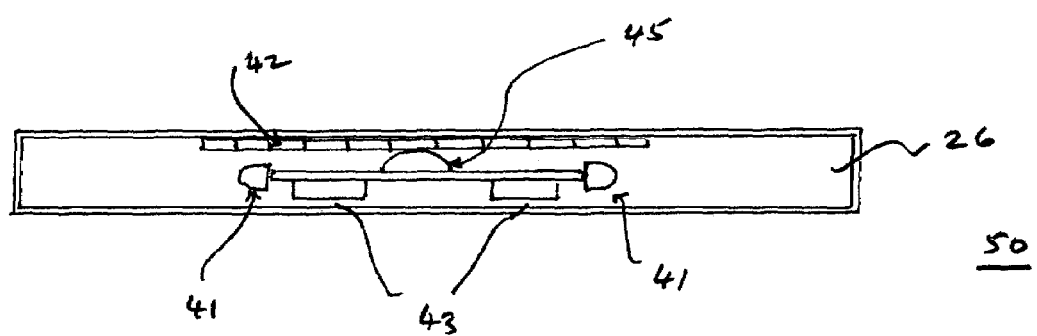
FIG. 3 presents the rear side view of the light emitting and transportation components and modules located in the cavity of the CD jewel box.

In the preferred embodiment of the instant invention, the light emitting and transportation means 40 comprise two modules 42 and 44 co-located in the cavity 26 of the CD jewel box 50, as seen in FIGS. 1 and 3. The light emitting and transportation means module 44 consists of one or more high intensity LED light bulbs 41 connected electrically, using appropriate wiring and circuitry, to one or more battery cell 43 and one or more pressure activated switch 45 to turn the bulbs on or off, or otherwise regulate their light. The switch 45 can be programmed so that after a prescribed short time following turn-on, the light switches off automatically. The light emitting and transportation means module 42 consists of one or more optical lenses, which are appropriately positioned in close proximity of module 44 to transport the light from the LED bulbs and illuminate the CD jewel box as desired. The modules herein can be assembled using conventional circuit fabrication processes known in the art, such as mounting the components on a printed circuit board or designing and constructing an integrated circuit on a chip. Alternatively, the various components comprising the light emitting and transportation means 40 may be assembled as discrete components. All of these are within the scope of the present invention.

To implement the light emitting and transportation means in the CD jewel box, the CD support tray 20 is removed from the CD storage compartment 10. The light emitting and transportation means 40, comprising modules 42 and 44, are located in the desired configuration in the storage compartment 10 near its rear wall 11. The preferred configuration includes positioning the pressure activated switch 45 so that it faces the horizontal wall 23 of support tray 20 when received within storage compartment 10 so that the switch 45 can be activated by applying pressure in a direction normal to the horizontal wall 23. In the preferred embodiment of the present invention, a mechanically compliant lens or lens module 42 occupies the space between the switch 45 and horizontal wall 23. Upon insertion of support tray 20 into the storage compartment 10, the modules 42 and 44 comprising the light emitting and transportation means 40 are captured within the cavity 26 formed between the walls 21 and 23 of the support tray 20 and the walls 11, 16, and 18 of the storage compartment 10.

In use, the CD is secured using the feature 24 in the support tray 20 inside the storage compartment 10, and the lid is 30 closed. Appropriate artwork is provided in the CD jewel box. For CD identification and differentiation, the light emitting and transportation means are activated by holding the CD jewel box 50 in hand and applying finger or thumb pressure on the exposed surface of the horizontal wall 23, which is constructed preferably from a transparent plastic, by processes known in the art. Because of the structural compliances of the horizontal wall 23 and any intervening lens material 42, the applied pressure deflects the wall 23 towards the base 12 of the storage compartment 10, whereupon the wall 23 contacts the switch 45, either directly or by way of the intervening lens material 42. The applied pressure is sensed by the switch 45 which then activates the module 44 causing it to apply battery 43 power to, or cut off power from, the light bulb 41.

Figure 4:
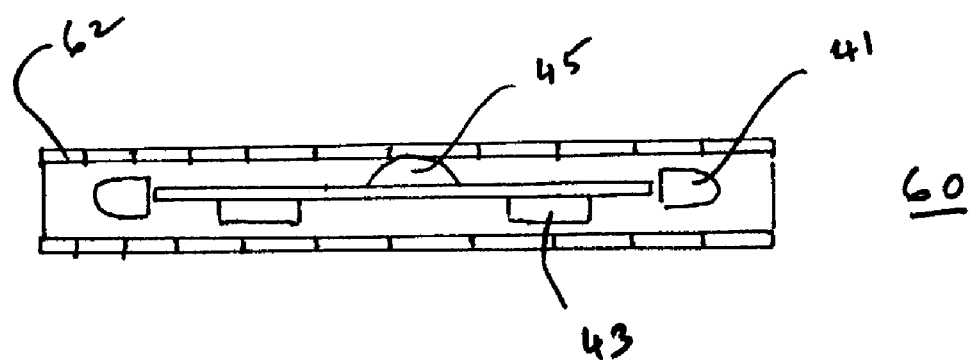
FIG. 4 shows a single light emitting and transportation module that integrates the lens with the components used for emitting light.

In another embodiment of the preferred invention, modules 42 and 44 are combined into a single integrated module 60, which, as shown in FIG. 4, combines within it all the functions associated with the LED bulb 41, battery 43, switch 45, and optical lens 42. The optical lens, which is preferably made of compliant transparent or translucent plastic material, can be of a planar or curved geometry 42 as in FIG. 3, cylindrical geometry 62 as in FIG. 4, or any other selected shape. The design and location of the lens(es) varies according to where illumination is desired in the CD jewel box. One or more optical lenses enhance the light effects. The lens may be of various colors. The lens shape, design, and texture can be customized.

In yet another embodiment of the present invention, the switch 45 may be activated by non-contact methods, such as by motion, sound, or light sensing. Similarly, light generation means using devices other than LEDs may also be used. The light from the LED bulbs can be programmed for continuous, blinking, or fading in and fading out display. The LED bulbs can be of the same or different colors. In each of the embodiments of the present invention, however, the multifunction light from one or more high intensity bulb 41 dynamically illuminates the prescribed space within the jewel box. All of these configurations are within the scope of the claims of the present invention.

The lens can also display pre-programmed flashing, animated text, and graphics with electronic ink. As the cost of the electronic ink decreases in the future, the horizontal wall 23 enclosing the cavity 26 can be used with the lens 42 to display text, graphics, and animation to enhance the visual effects created by the light from the LED bulbs, based on CD box graphics or the theme of the recording. The switch, which may be activated by pressure, motion, sound, or light, can control the text or graphics animation. After turning the switch on, it may be turned off manually or programmed to turn off automatically after a pre-set time. The illuminated jewel box of the present invention can hold one or more CDs.

The present invention is simple to use and economical in cost to manufacture. The invention is not limited in its application to the details of construction or the arrangements of the components set forth in the description or the drawings herein. Since numerous modifications and changes will readily occur to those of ordinary skill in the art, it is not desired to limit the invention to the exact construction and operation shown and described in the specification. The optimum dimensional relationships of the components comprising the present invention, including variations in size, materials, shape, form, function, operation, assembly, and use are deemed readily apparent and obvious to one of ordinary skill in the art. All relationships equivalent to those illustrated in the drawings and described in the specification are intended to be encompassed by the present invention. Accordingly, all such suitable modifications and equivalents are deemed to fall within its scope. The drawings and the phraseology and terminology employed herein for the purpose of the description should not be construed as limiting.

All embodiments of the present invention apparent to those of ordinary skill in the art are within its scope. The device comprising the present invention is to be limited only by the claims herein presented and not by what has been particularly described in the specification.

I claim:

1. An illuminated CD jewel box comprising:
   a storage compartment having a rectangular base and a plurality of contiguous vertical sidewalls, including a rear wall, extending therefrom;
   a support tray having a similar rectangular base and a rear wall extending therefrom, this rear wall terminating in a horizontal wall parallel to the base of the support tray and extending away from the support tray rear wall, so that when the support tray is received within the storage compartment, the rear wall of the support tray is separated from the rear wall of the storage compartment and the horizontal wall terminates at the rear wall of the storage compartment, thereby defining a cavity enclosed by the storage compartment's base, rear wall, and portions of the sidewalls contiguous with the rear wall and the support tray's rear and horizontal walls;
   at least one each of light bulb, power supply, and switch that are electrically connected, and at least one lens, all of which are located in the cavity;
   a lid hinged at said portions of the contiguous sidewalls of the storage compartment along and in between the rear walls of the storage compartment and the support tray.

2. The illuminated CD jewel box of claim 1 wherein the power supply includes a battery.

3. The illuminated CD jewel box of claim 1 wherein the switch is activated by pressure.

4. The illuminated CD jewel box of claim 1 wherein the switch is activated by motion.

5. The illuminated CD jewel box of claim 1 wherein the switch is activated by sound.

6. The illuminated CD jewel box of claim 1 wherein the switch is activated by light.

7. The illuminated CD jewel box of claim 1 wherein the light bulb includes a light emitting diode.

8. An illuminated CD jewel box comprising:
- a storage compartment having a rectangular base and a plurality of contiguous vertical sidewalls, including a rear wall, extending therefrom;
- a support tray having a similar rectangular base and a rear wall extending therefrom, this rear wall terminating in a horizontal wall parallel to the base of the support tray and extending away from the support tray rear wall, so that when the support tray is received within the storage compartment, the rear wall of the support tray is separated from the rear wall of the storage compartment and the horizontal wall terminates at the rear wall of the storage compartment, thereby defining a cavity enclosed by the storage compartment's base, rear wall, and portions of the sidewalls contiguous with the rear wall and the support tray's rear and horizontal walls;
- light emitting and transportation means including at least one lens in the cavity;
- a lid hinged at said portions of the contiguous sidewalls of the storage compartment along and in between the rear walls of the storage compartment and the support tray.

9. The illuminated CD jewel box of claim 8, wherein the lens is customized for shape, design, and texture.

10. The illuminated CD jewel box of claim 8, wherein the lens displays pre-programmed flashing text, graphics, and animation.

11. The illuminated CD jewel box of claim 8, wherein the lens is made from compliant plastic material.

* * * * *